United States Patent [19]

Johnson et al.

[11] Patent Number: 4,762,740
[45] Date of Patent: Aug. 9, 1988

[54] RESIN TRANSFER MOLDING CORE, PREFORM AND PROCESS

[75] Inventors: Carl F. Johnson, New Boston; Norman G. Chavka, Allen Park, both of Mich.

[73] Assignee: Ford Motor Company, Dearborn, Mich.

[21] Appl. No.: 61,763

[22] Filed: Jun. 15, 1987

[51] Int. Cl.$^4$ .............. B32B 3/02; B29C 39/10
[52] U.S. Cl. .................. 428/68; 264/257; 264/263; 264/266; 428/71; 428/76; 428/109; 428/157; 428/161; 428/192; 428/193
[58] Field of Search ........... 264/257, 271.1, 275, 264/263, 266; 428/68, 71, 76, 109, 157, 192, 193, 161, 162

[56] References Cited

U.S. PATENT DOCUMENTS

| | | | |
|---|---|---|---|
| 1,260,002 | 3/1918 | Lanhoffer | 425/405.1 |
| 2,770,026 | 11/1956 | Petersilie et al. | 28/169 |
| 2,812,570 | 11/1957 | Petersilie et al. | 428/229 |
| 3,021,569 | 2/1962 | Lyman | 264/545 |
| 3,030,256 | 4/1962 | Rosenthal | 428/85 |
| 3,594,877 | 7/1971 | Suda et al. | 425/405.2 |
| 3,791,902 | 2/1974 | Hanke et al. | 156/212 |
| 3,817,806 | 6/1974 | Anderson et al. | 156/161 |
| 4,024,007 | 5/1977 | Jago et al. | 264/257 |
| 4,123,494 | 10/1978 | Evrard et al. | 264/258 |
| 4,378,263 | 3/1983 | Logan | 264/263 |

Primary Examiner—William J. Van Balen
Attorney, Agent, or Firm—Peter D. McDermott; Roger L. May

[57] ABSTRACT

The invention provides a preform for a resin transfer molding process and a preform core for same. The invention further provides a resin transfer molding process employing such preform. A surface portion of the core having a concavity therein, the core comprises a flexible web secured to its surface forming a convexity over such concavity. The convexity formed by the web is deformable into the concavity during the resin transfer molding operation, but prior to the molding operation is sufficiently firm to support, without substantial deformation, oriented continuous fibers applied under tension onto the surface of the core.

23 Claims, 3 Drawing Sheets

RESIN TRANSFER MOLDING CORE, PREFORM AND PROCESS

INTRODUCTION

This invention is directed to resin transfer molding ("RTM") and, more specifically, to an RTM preform, to a core for such preform, and to an RTM process employing same.

Resin transfer molding is a closed mold, low pressure process applicable to the fabrication of complex, high performance composite articles of both large and small size. Several different resin transfer molding processes are well known to the skilled of the art. The process is differentiated from various other molding processes in that reinforcement material, such as fiberglass or other fiber reinforcement material, is placed separately into a molding tool cavity and then combined with resin within the mold cavity to form a fiber reinforced plastic ("FRP") composite product. Typically, a pre-shaped fiber reinforcement is positioned within a molding tool cavity and the molding tool is then closed. A feed line connects the closed molding tool cavity with a supply of liquid resin and the resin is pumped or "transferred" into the tool cavity where it impregnates and envelops the fiber reinforcement and subsequently cures. The cured or semi-cured FRP product then is removed from the molding tool cavity. It should be understood that as used herein, the term resin transfer molding and RTM refer to any molding process wherein a fiber reinforcement material or structure is positioned within a mold into which resin is subsequently introduced. Thus, variations such as so-called press molding or squeeze molding and the like are within the scope of such terms. Another variant of resin transfer molding, often referred to as structural reaction injection molding, uses a highly reactive resin system comprising two components pumped from separate holding tanks under relatively high pressure into an impingement mixing chamber, and from there directly into the molding tool cavity. The tooling typically comprises a metallic shell to facilitate heat transfer. Although the mixing pressure is high, the overall pressure of the resin in the molding tool typically is only about 50–100 psi. The resin flows into the molding tool cavity and wets-out the fiber reinforcement as the curing reaction is occurring. Typically, the fiber reinforcement material can be used in amounts up to about 20–30 weight percent of the fiber plus resin composite. Due to the rapid resin cure, flow distances are limited and for longer flow distances multiple inlet ports may be required. Another varient of resin transfer molding, referred to generally as high speed resin transfer molding, is particularly suitable for commercial production of products requiring a 3-dimensional preform comprising a core, with attachment inserts, etc. as required, and fiber reinforcement material over all or selected portions of the surface of the core. Fiber content typically is in the 35–50 weight percent range and may be a mixture of both continuous fiber (random and/or oriented) and chopped random material. Tooling for high production volumes typically comprises steel in order to contain moderate molding pressures of 100–500 psi and for good heat transfer characteristics. For more limited production requirements, aluminum or zinc tooling may be acceptable. Typically, molding is carried out at elevated temperatures to reduce the cure time. The preform is positioned within the mold, the mold is closed and resin is injected. At higher reinforcement levels, that is, at higher fiber weight content, the mold may be left slightly opened during resin injection to promote more rapid filling of the molding cavity; the mold cavity would then be fully closed. Preferably, the curing of the resin is accomplished in the mold such that the product will require no post-bake cycle and will have an acceptable dimensional stability. For complex components or components having critical tolerance requirements, a fixtured post-cure may be required for adequate dimensionel stability. Typically, cycle times range from about 1 minute to about 4 minutes for small components and from about 8 minutes to about 12 minutes or longer for large, complex structures.

In view of the fact that RTM processes allow placement of fiber reinforcement materials, containing any of the various available fiber types or combinations thereof, in the mold cavity with minimal subsequent movement of the reinforcement during injection of the resin, the fiber reinforcement can be designed for optimum performance at minimum weight. That is, the fiber reinforcement can be designed and assembled with the most appropriate fiber type (glass, graphite, aramid, etc.), either chopped or continuous, random or oriented, in each of the various different portions of the reinforcement structure. Again, this yields a product of more optimum performance at reduced weight. Also, the low pressure required for the low resin injection pressures which are used allows the use of less expensive presses and the use of tooling somewhat less costly than that employed in high volume compression molding or thermoplastic stamping processes. Furthermore, there is the opportunity for significant tooling expense reduction, when compared to steel components for example, where a significant degree of sub-part integration is achieved. In addition, the low pressures employed in RTM processes enables much larger structures to be molded, since current compression molding processes are limited by the availability of sufficiently large presses.

A significant advantage of the RTM processes is the ability to incorporate cores and inserts into the product design. That is, in addition to the fiber reinforcement material, hollow cores or foam cores, for example, so-called structural foam cores, or the like can be incorporated into a fiber reinforcement preform which is positioned within the mold cavity prior to introducing the resin. Typically, the fiber reinforcement is wound onto the core or otherwise attached to the surface thereof. As used herein, the term preform refers to a reinforcement structure which is adapted to be placed in an RTM molding tool cavity and which comprises a core, in one or more segments, and fiber reinforcement material on the outer surface of the core. Inserts, such as metal devices to serve as attachment means for assembly of the FRP product with other structures, and a wide variety of other devices can be incorporated into the preform. The incorporation of cores, including, for example, structural and semi-structural foam cores and removable cores, enables a great deal of control over the strength, weight and other physical properties of the FRP product. It enables the fabrication of 3-dimensional structures with, for example, deep sections discontinuous contours and other configuration complexities.

Considerable effort is now being made to further advance the technology of RTM processes. Specifically, development is on-going in the areas of tooling fabrication, resin chemistry, control of resin flow and cure rates and fabrication of complex preforms and the cores for same. Fabrication of the preform is an area most critical to the successful implementation of an RTM process in the production of any given product, and especially in the case of a product having a complex surface geometry. Design and development of an optimized preform and of a process to fabricate same must take into account and utilize the physical characteristics of the various available composite materials. With respect to the fibrous reinforcement material, chopped, random E-glass fiber material may be employed, where suitable, in view of its low cost and ease of use. Such random fiber reinforcement material is available in the form of flat sheets or mats which can be cut and formed to fit, as needed, onto the surface of the core. Several layers of mat can be overlapped to provide greater depth of material where needed. Typically, the several layers are stitched together either prior to or at the time of attachment to the core. For some applications, it will be required to employ flat sheets or mats of random glass which have been pre-shaped prior to attachment to the core. Such mats comprise not only the random glass but also small amounts of binder resin, either thermoset or, more typically, thermoelastic binder resin. The binder allows the sheet to retain the desired shape when heated and pressed in a suitable forming die, without the cutting and piercing required for non-resinated mats. Small amounts of continuous reinforcement fibers are in some cases included in the mat to improve the physical properties, where required. Presently, however, this process cannot easily produce radical 3-dimensional shapes, such as deep concavities.

The most versatile technique for creating 3-dimensional RTM preforms of complex shape is the so-called spray-up process, wherein chopped glass rovings are sprayed onto a screen. A small amount of resin is introduced into the stream of chopped glass to cause it to be retained on the screen. When the fibers accumulate to the proper weight or depth, the resin is cured, causing the resultant preform to retain its shape. Typically, vacuum is applied to the back side of the screen to hold the glass onto the screen as it accumulates and also to help ensure uniformity of fiber depth in the various areas of the screen. As the holes in the screen become covered by glass, the remaining open areas tend to attract more glass, causing a self-leveling action. This process, while capable of producing preforms of complex shape, is suitable generally to produce only products of moderate to low physical properties (i.e., strength, etc.). Not only does the binder resin sprayed with the chopped reinforcement tend to seal off the fiber bundles, resulting in incomplete resin impregnation of the preform during the molding process, but in addition, chopped random reinforcement is at the lower end of structural composite performance. Products requiring greater strength generally require the use of oriented continuous fiber reinforcement material, at least in selected areas.

There are currently several techniques for making preforms containing oriented materials. Oriented materials, generally comprising continuous glass roving, can be attached to the surface of a core or preform. A typical oriented reinforcement material, oriented glass fiber fabric, may be in the form of woven, knitted or braided fabric or may comprise simply uniaxial bundles of fibers, referred to as roving, arranged in parallel, optionally with multiple layers oriented at an angle to one another. That is, such sheets may comprise either a single layer, all the reinforcement being in the 0° direction, or multiple layers with one layer at some angle to its adjacent layers. These materials are not woven, as in cloth, but rather are stitched together with a thread of polyester, KEVLAR (trademark), or the like. Use of uniaxial rather than woven fiber fabrics often yields improved physical properties and better resin wet-out in the final product.

The structural efficiency of preforms employing oriented fibers is due primarily to the more exact placement and orientation of the reinforcement material where needed. Layers of oriented reinforcement sheets can be stacked and further stitched together into a 3-dimensional structure. Oriented fibers also can be added to an RTM core or preform by known filament winding techniques, wherein the core (or a preform, e.g. a core already having some random and/or oriented reinforcement material) receives continuous fibers unwound from a plurality of spools onto the surface of the core. In one alternative the core is rotated to pull fibers from the source spools. In another alternative the core is held stationary while the fibers are wrapped around it. Similarly, continuous fiber reinforcement material can be woven, braided or knit around the core.

There is presently, however, a significant limitation regarding the use of oriented continuous fiber reinforcement material, specifically, its limited ability to follow concave contours of a core. Where the continuous fibers are placed or wrapped onto the surface of the core under tension, the fibers naturally tend to bridge over any concave configuration in the core surface. As used herein, a fiber or fabric is applied "under tension" to the surface of a core or preform when there is at least sufficient tension to bring it into contact with the surface of the core or preform with substantially no slack. Thus, for example, where the core is held in position and continuous fibers are braided, knitted, woven or wrapped onto the outer surface thereof, the tension under which the fibers are positioned onto the core will cause them follow a geodesic path rather than a concave surface contour of the core. In the subsequent molding process, the mold is closed upon the preform and a convex section of the surface of the molding tool cavity, which is intended to register with the corresponding concave surface region of the preform, encounters the continuous fibers bridging over the underlying concave surface of the core. Because the oriented fibers have been laid down onto the core under tension, there is no slack and they yield insufficiently to accommodate the aforesaid convex surface section of the molding tool. The result is either a distortion of the preform or the rupturing of the oriented fibers. Consequently, in the production of RTM components calling for the enhanced physical properties provided by continuous oriented fibers, it has not been practical or in some cases even possible to use filament winding, weaving, and the other above-mentioned methods for placing continuous fibers onto the surface of an RTM core under tension. In fact, it may have been heretofore impractical by any known methods, including hand lay-up means, to achieve accurate, reproducible placement of continuous oriented fibers under tension in a preform. Consequently, it has in some cases been commercially impractical to produce such parts using an RTM process and to achieve the consequent advantages thereof.

It is an objective of the present invention to provide an RTM preform and core therefor suitable for use in an RTM process to produce a product having continuous oriented fibers at concave surface areas. It is a further object of the invention to provide an RTM process employing such preform and core. More specifically, it is an object of the present invention to enable the fabrication of resin transfer molding preforms by the placement, under tension, of oriented continuous fiber reinforcement onto a core at a surface area where there is a hollow or other concavity in its surface configuration. Additional objects and advantages of the invention will be understood from the drawings and the following description of the invention.

SUMMARY OF THE INVENTION

According to a first aspect of the invention, a core suitable for a resin transfer molding preform is provided, a selected surface portion of such core having a concavity therein. The core comprises a flexible web secured to the surface of the core, such flexible web forming a convexity over the aforesaid concavity. The convexity formed by the web is deformable into the concavity during the resin transfer molding operation, but prior to the molding operation is sufficiently firm to support, without substantial deformation, oriented continuous fibers applied under tension onto the core.

According to another aspect of the invention, a preform for a resin transfer molding process is provided. The preform comprises a core, as described above, plus oriented continuous fibers applied under tension onto at least a portion of the aforesaid selected surface portion of the core having a concavity therein. The core or the preform may, optionally, comprise additional fiber reinforcement material at the same and/or other locations on the surface of the core. As used herein, the terms "application", "apply" and any variation thereof, when used with reference to putting continuous fiber reinforcement onto the surface of a preform core (either directly or over other fiber reinforcement material) means positioning them under tension and fixing, attaching or adhering them in such position by any manner or means. It will be apparent to those skilled in the art in view of this disclosure, that the continuous oriented fibers overlaying the convexity formed by the web will be deformable into the concavity of the underlying core, without breakage of the fibers or distortion of the core, under pressure of a molding tool cavity surface convexity designed to register with such core concavity.

According to another aspect of the invention, a method is provided of making a resin transfer molding preform for a product having a surface concavity. Specifically, such method comprises positioning oriented continuous fibers under tension onto a core, as described above, i.e., a core having a selected surface portion having a concavity therein and a flexible web secured thereto forming a convexity over such concavity. Also, as described above, the convexity formed by the web is deformable into the concavity during the resin transfer molding operation, but is sufficiently firm to support oriented continuous fibers without substantial deformation during the application of such fibers to the core under tension According to another embodiment of the invention, a resin transfer molding process comprises positioning a preform, as described above, in the cavity of a resin transfer molding tool, closing the molding tool on the preform, the surface of the molding tool cavity deforming the convexity formed by the aforesaid web and the overlying fibers into the core surface concavity. Resin then is introduced into the molding tool cavity.

According to another aspect of the invention, a resin transfer molding process is provided, which process comprises:
(A) positioning a preform in a concavity of a resin transfer molding tool, the preform comprising a core and oriented continuous fibers positioned under tension on at least a selected surface portion of the core over a convex web, as described above;
(B) closing the molding tool on the preform, the molding tool cavity pressing the web convexity and the fibers overlaying it into the core concavity; and
(C) introducing resin into the concavity of the molding tool to impregnate the fiber reinforcement material of the preform.

DESCRIPTION OF THE DRAWINGS

Other and further objects, features and advantages of the invention will be more fully explained in connection with the accompanying drawings in which presently preferred embodiments of the invention are shown by way of illustration and not be way of limitation.

DETAILED DESCRIPTION OF THE INVENTION

Figure 1:
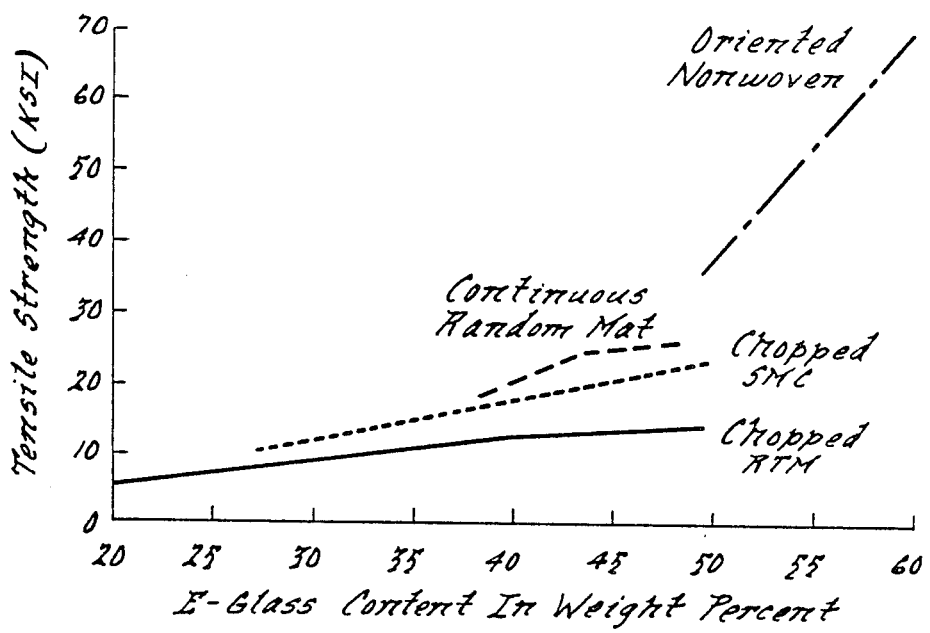
FIG. 1 is a graph showing the tensile strength of RTM materials comprising E glass fiber reinforcement in various configurations.
Figure 2:
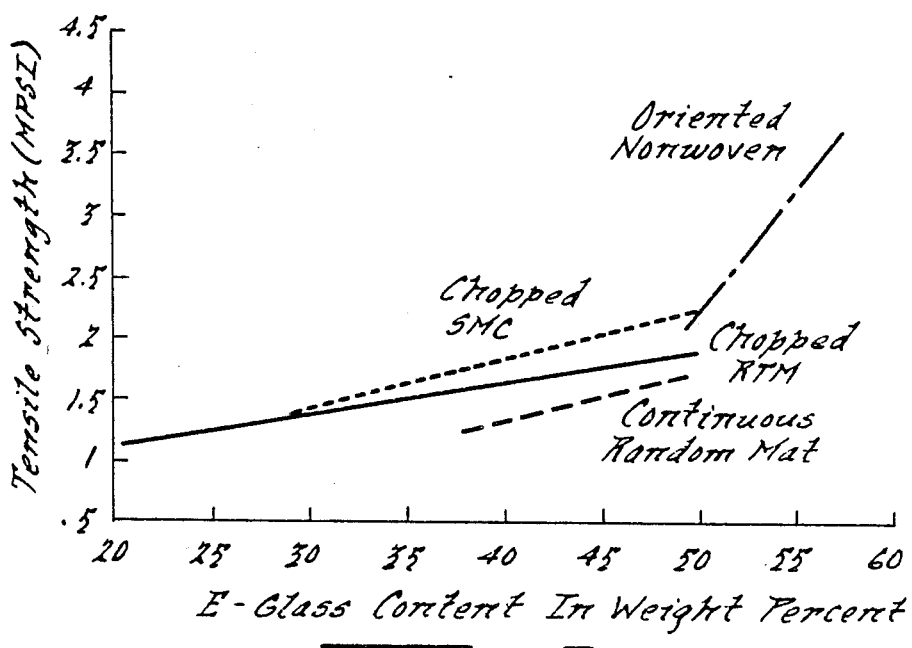
FIG. 2 is a graph showing the tensile modulus of RTM materials comprising E glass fiber reinforcement material in various configurations.

FIGS. 1 and 2 show certain physical properties of fiber reinforced plastic composites comprising fibrous reinforcement material of various different configurations. Specifically, FIGS. 1 and 2 show the tensile strength and tensile modulus, respectively, of a composite comprising E glass and thermoset resin. For each type of composite shown, specifically, sheet molding compound (SMC) comprising chopped glass ("Chopped SMC"), resin transfer molded compound comprising chopped glass ("Chopped RTM"), composite formed using mats of randomly oriented continuous glass fibers ("Continuous Random Mat"), and composites formed using oriented nonwoven fibers ("Oriented Nonwoven"), the physical properties are shown for a range of glass content which in each case extends at its high end to the reasonably practical limit thereof. It can be seen from FIGS. 1 and 2 that oriented nonwoven glass enables glass contents considerably greater than that practically feasible using other glass fiber reinforcement configurations. In addition, it can be seen that the oriented nonwoven glass fiber reinforcement provides both tensile strength and tensile modulus far in excess of that possible with the other reinforcement materials. Other oriented fiber reinforcement materials, such as woven, knitted, etc. enable glass content approaching that possible with the oriented nonwoven fiber reinforcement and provide composites having tensile strength and tensile modulus approaching that achieved with the oriented nonwoven reinforcement material. Accordingly, the ability to employ oriented reinforcement materials to fabricate resin transfer molding preforms can result in finished products of greater strength and/or correspondingly lighter weight for a required level of strength and performance.

As discussed above, in an RTM process, a fiber reinforcement preform in one or more pieces is provided to fit the required geometry of the desired FRP product. The preform is arranged in the mold, multi-piece preforms being either preassembled prior to placement within the molding tool cavity as a single unit or being assembled within the molding tool cavity one piece at a time. Once the preform is in the molding tool cavity the mold is closed. In some instances a vacuum then is applied to the molding tool cavity to extract air therefrom. Resin is injected into the mold at low pressure, often below atmospheric pressure. It is one advantage of resin transfer molding processes that the low pressures involved enable the use of low cost molding tool materials, such as epoxy and the like. The low pressures, however, result in low rates of resin flow into the molding tool cavity. As noted above, however, a primary benefit of the process is the ability to fabricate large, complex structures with a maximum of part integration at a relatively low cost.

Suitable cores according to the present invention can comprise any of the numerous core materials known to those skilled in the art and may include, for example, any of the various cores mentioned above. Thus, for example, structural and semi-structural foam can be molded in a suitable molding tool to form a core having the desired configuration. While the selection of suitable foam material will depend largely on the application for which the core and the ultimate product are intended, generally preferred in view of its favorable costs and good physical properties are any of the numerous commercially available polyurethane foams. It will be understood, however, that suitable cores also can comprise any of numerous alternative materials. Thus, for example, a suitable core may comprise a formed metal or plastic sheet or screen having the desired configuration. In appropriate applications one or more segments or the entire core may be removable from the product following the molding processing. Thus, for example, where it is desired to render a certain portion of the product more readily crushable (i.e., less strong in the sense of being more readily crushable) than another portion of the product, the core from the former portion of the product may be removed. Suitable cores also include pressurized bladders, which optionally are deflatable and removable, and other types of mandrels, the primary consideration being that it act as a support for the fibrous reinforcement material during the resin transfer molding process. Additionally, as used herein, it will be understood that the core onto which the continuous oriented fibers are wound, wrapped, woven, knitted, etc. may already comprise fibrous reinforcement material, either in the same section being overwrapped with the continuous oriented fibers and/or in different sections thereof.

Suitable fibrous reinforcement materials have been described above and include, for example, numerous materials known to the skilled of the art, among which are such commercially available materials as E glass fibers, S glass fibers, graphite fibers, aramid fibers (including KEVLAR (trademark)) and the like. For use in the preforms and in the preform cores of the present invention, such fibrous reinforcement material can be used in any of various configurations including, for example, random chopped fiber, continuous random fiber, and oriented continuous fiber, for example, nonwoven, woven, knitted, braided, etc. As discussed above, chopped fiber can be used either in the form of a mat or can be blown onto a screen to which it is held, optionally, with the aid of a vacuum.

Resins suitable for RTM processes are well known to the skilled of the art and include many commercially available resins. Suitable resins have been discussed above and include both thermosetting plastic and, more typically, thermosetting resins. Most common are the epoxy, vinyl ester and polyester resins in view of their strength and performance characteristics and relatively favorable cost and availability. Additional suitable resins for use in the present invention will be apparent to the skilled of the art in view of the present disclosure.

Figure 3:
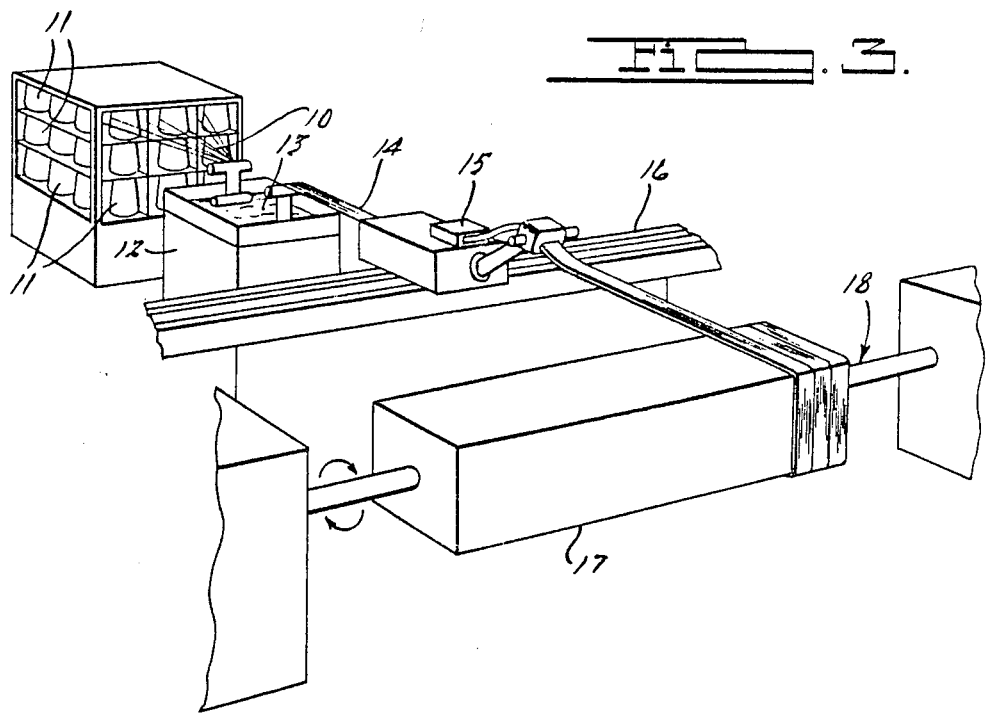
FIG. 3 illustrates a typical RTM preform production process, specifically, a filament winding process, wherein continuous oriented fibers are wound onto the exterior surface of a preform core.

Referring now to FIG. 3, a filament winding apparatus and process is shown which is suitable for use in the present invention. Continuous fibers 10, e.g. glass fibers, are fed from glass spools or creels 11 optionally to a resin impregnation bath 12. The fibers are brought together and passed through the resin 13 or are used without prior resin impregnation. Reinforcement tape 14 passes to a filament application head 15 mounted on track 16 for controlled positioning onto work piece 17. Work piece 17 is mounted on a mandrel 18 which rotates the work piece, whereby the glass fibers are pulled onto the outer surface of the work piece. The drag placed on the glass filaments causes the reinforcement tape 14 to be positioned onto the work piece under tension. It should be noted that the reinforcement fibers therefore make contact with the surface of the work piece without any substantial slack. For the same reason, the reinforcement tape follows the contour of the surface of the work piece. It will be understood in the foregoing discussion that, in the context of the present invention, the work piece may be an RTM core with or without fiber reinforcement material already on the surface thereof, onto which continuous fibers are being applied.

Figure 4:
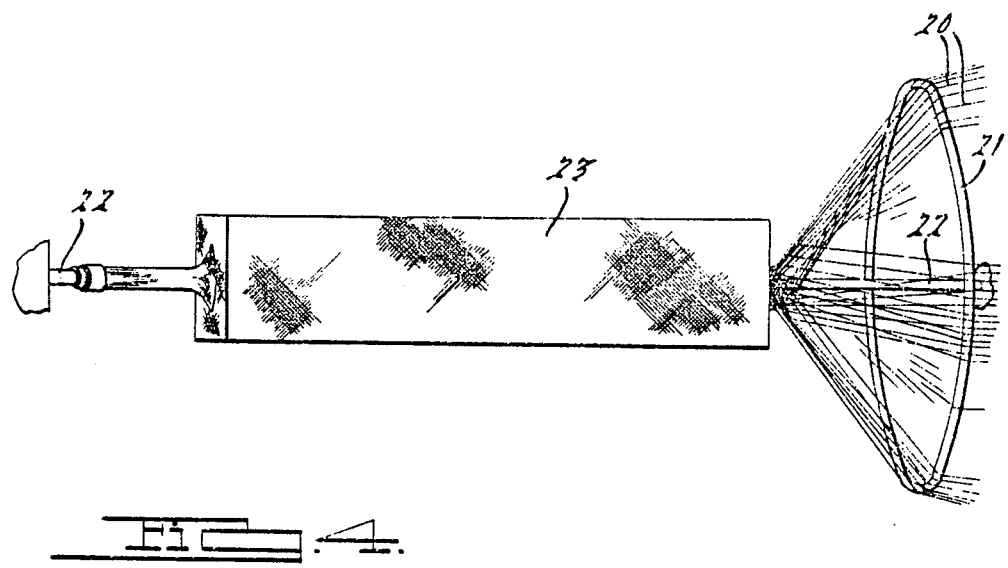
FIG. 4 illustrates a typical RTM preform fabrication process, wherein continuous oriented fibers are braided onto the exterior surface of a preform core.

Referring now to FIG. 4, an alternative means is illustrated for positioning continuous fibers onto an RTM core under tension. Specifically, fibers 20 are fed from spools or creels, as described above regarding FIG. 3, over the outer surface of a spacer ring 21. A mandrel 22 extending along the axis of the spacer ring 21 holds the work piece 23, i.e., the RTM core. The continuous fibers are being knitted or braided onto the outer surface of the work piece. Here again, as in the filament winding process illustrated in FIG. 3, the continuous fibers are being positioned onto the surface of the work piece under tension and closely follow the surface contour of the work piece. In the context of the present invention, the work piece would be an RTM core optionally having additional fiber reinforcement material, chopped and/or continuous, on the surface thereof, such that the fibers 20 are braided thereover.

Figure 5:
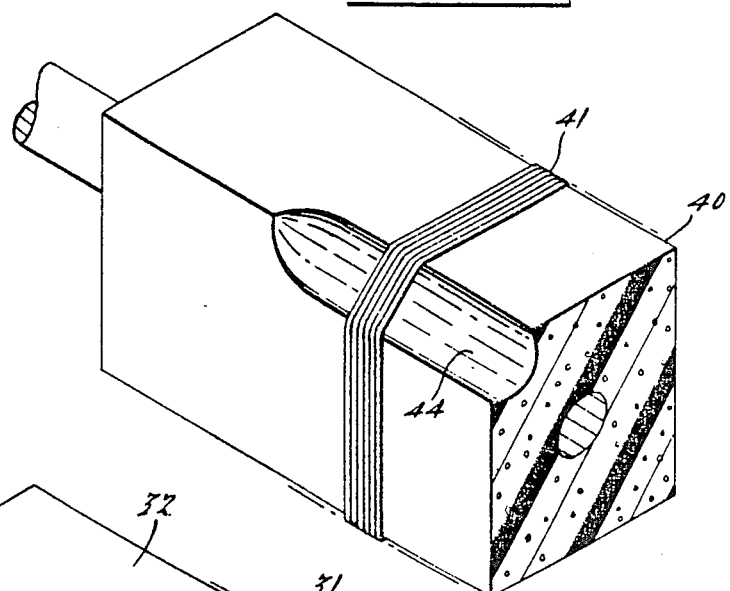
FIG. 5 is a perspective view, in cross-section, of a typical preform core having a concavity in the surface thereof. Continuous oriented fibers have been wound under tension around the core and can be seen to bridge the concavity rather than following the surface contour thereof.
Figure 6:
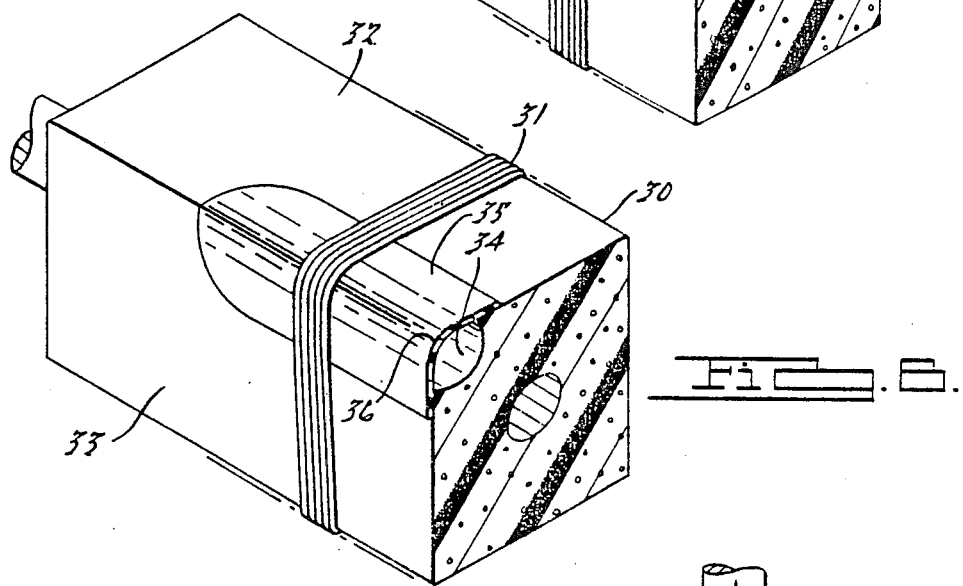
FIGS. 6 is a perspective view, in cross-section, of an embodiment of the present invention, showing a core, as in FIG. 4, but further comprising a web secured thereto and forming a convexity over the concavity thereof.
Figure 7:
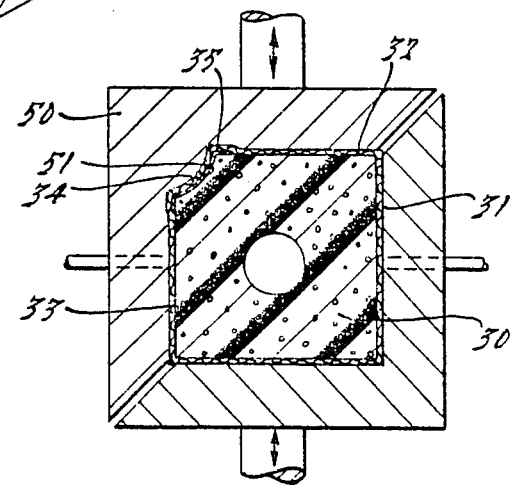
FIG. 7 is a cross-section of the preform of FIG. 6 in an RTM molding tool, wherein the molding tool cavity surface (registering with the concavity of the core) has inverted the web and the overlying fibers into the core concavity.

FIG. 6 in conjunction with FIG. 7 (and in comparison with FIG. 5) illustrates the present invention and demonstrates the advantages provided by the present invention. Specifically, in FIG. 6 is shown a resin transfer molding core 30 comprising polyurethane structural foam. Continuous glass fibers 31 are wrapped under tension, for example by a filament winding process, onto the outer surface of the core 30 to produce a resin transfer molding preform. Optionally, of course, the preform would comprise additional fiber reinforcement material including continuous fibers wrapped over the entire outer surface thereof. It can be seen that the fibers 31 have followed the contour of the surface of the core. Specifically, it can be seen that they lie in substantial contact with surfaces 32 and 33 of the core. At the edge between these two surfaces the core has a concave surface 34. A web 35 comprising imperforate plastic sheet is attached to the surface of the core and forms a convexity 36 over the concavity 34. The continuous fibers 31 overlie the web and are in substantial surface contact therewith. In contrast, referring to FIG. 5, it can be seen that without the web 35 filaments 41 wrapped under tension onto a core 40 having a concavity 44 corresponding to concavity 34 of core 30 shown in FIG. 6, bridge over the concavity 44 and do not make contact with the concave surface of core 40.

Referring now to FIG. 7, the core 30 of FIG. 6 is shown in a resin transfer molding tool. It can be seen that web 35 and that portion of continuous fibers 31 overlying it have been deformed by molding tool 50. Specifically, the convex surface portion 51 of the molding tool has inverted the convexity 36 of web 35 into the concavity 34 of the core 30. In the preferred embodiment shown, the surface area of the convexity formed by the web closely approximates that of the concavity 34. Thus, there is little or no excess of material and the fibers and web form a smooth surface contact with the underlying core.

In contrast, it will be apparent to those skilled in the art from the present disclosure that the RTM preform illustrated in FIG. 5 could not be successfully employed in the molding tool of FIG. 7. Specifically, it will be apparent that the convexity 51 of the molding tool 50 would encounter the fibers 41 bridging over concavity 44 of core 40. Thus, in closing the mold it would have been necessary either to rupture the fibers to make way for convexity 51 or to have deformed core 40. Accordingly, without the benefit of the present invention it would generally not have been possible to apply continuous filaments under tension onto an RTM core having a concavity in the surface thereof. With the advantage of the present invention, resin transfer molding preforms can be formed employing methods, most notably automated methods, for applying continuous fibers under tension onto the surface of a core, even in those cases where such core has a concavity in the surface thereof.

The web employed to form a concavity over an RTM core convexity can be any of numerous suitable sheet-like materials. Essentially, it is necessary only that the web be sufficiently flexible to permit its deformation into the underlying convexity of the core during the resin transfer molding process and that it be sufficiently firm or stiff to prevent any substantial deformation during the application of continuous fibers thereover in the production of the preform. Thus, for example, the web may comprise metallic screen, plastic screen or imperforate plastic sheet. Where it is preferred that the resin be prevented from contacting the underlying core, a resin impervious web can be employed such as, for example, the afore-mentioned imperforate plastic sheet. Additional suitable web materials will be apparent to the skilled of the art in view of the present disclosure.

Porous screens are preferred where improved resin flow and, therefore, adhesion to the surface of the core is desirable. Amongst the various porous screen-type web materials, a metallic screen provides the further advantage of "RF screening". By selection of an appropriate plastic material and thickness, a plastic screen may be devised which would provide the advantage of a certain "memory" of the desired convex surface such that upon being inverted in the resin transfer molding process, it will snap into close surface contact with the underlying concave surface of the core. Amongst the various solid sheets of plastic suitable for use as the web is included polyethylene sheeting of appropriate thickness and type. Thermoplastic polyester sheeting or screens also may be used for good adhesion between the core and the fibrous reinforcement material of the preform, where the RTM process temperature will reach the softening point of such thermoplastic. According to one preferred embodiment of the invention, the web comprises styrenic plastic which in the course of the RTM molding process entirely dissolves into the resin which is injected into the mold. According to this embodiment, the fiber reinforcement material thus is brought into direct contact with the core. Stated generally, the web can be any material which provides a geodesically stable shape over which the continuous fiber reinforcement material can be positioned under tension.

Although, as noted above, the present invention is particularly advantageous for use where the continuous fiber reinforcement is to be applied over the core by an automatic fiber positioning means (e.g. filament winding, knitting, etc.) it should be recognized that the invention has usefulness also in the production of RTM preforms by hand lay-up procedures. Thus, for example, where it is desired to place a sheet of continuous fibers over a surface portion of a core, in which surface portion there is a concavity, and where it is impossible to stable or otherwise affix such sheet to the concave portion of the core surface, it may instead be necessary to stretch the sheet over a convexity corresponding to the concave surface of the core and formed by a web according to the present invention. Specifically, such sheet could be stretched over the web and stapled or otherwise attached to the surface of the core at a remote location.

The web can be attached to the core by any of numerous suitable means which would be apparent to the skilled of the art in view of the present disclosure. Thus, for example, the web can be stapled, adhesively bonded, etc. to the surface of the core. The most appropriate means of attaching the web to the surface of the core will be dictated in part by the material of the core, the material of the web and whether any additional fibrous

We claim:

1. A core for a resin transfer molding preform, a selected surface portion of said core having a concavity therein, wherein said core comprises a flexible web secured thereto forming a convexity over said concavity, said convexity being deformable into said concavity and being sufficiently firm to support, without substantial deformation, oriented continuous fibers applied thereover under tension.

2. The core of claim 1, wherein said web comprises material selected from the group consisting of metallic screen, plastic screen and imperforate plastic sheet.

3. The core of claim 1, wherein said web is resin impervious.

4. The core of claim 1, wherein said core comprises polyurethane foam.

5. The core of claim 1, wherein said core comprises a pressurized bladder.

6. The core of claim 1, wherein said core comprises a hollow plastic shell.

7. The core of claim 1, wherein the surface area of said convexity is substantially equal to the surface area of said concavity.

8. A preform for a resin transfer molding process, said preform comprising a core and fiber reinforcement material, a selected surface portion of said core having a concavity therein and said core comprising a flexible web secured thereto forming a convexity over said concavity, said convexity being deformable into said concavity and being sufficiently firm to support, without substantial deformation, oriented continuous fibers applied thereover under tension, said fiber reinforcement material comprising oriented continuous fibers positioned over said convexity.

9. The preform of claim 8, wherein said fiber reinforcement material further comprises chopped fibers.

10. The preform of claim 8, wherein said concavity in the surface of said core is a concavity relative the geodesic path of said oriented continuous fibers.

11. The preform of claim 8, wherein said oriented continuous fibers comprise at least one sheet of nonwoven continuous fibers.

12. The preform of claim 8, wherein said oriented continuous fibers comprise at least one sheet selected from a group consisting of woven continuous fibers, knitted continuous fibers and braided continuous fibers.

13. The preform of claim 8, wherein said oriented continuous fibers comprise continuous fibers woven onto said core.

reinforcement material is positioned between the continuous fibers and the underlying core.

While the invention has been described in detail with respect to certain presently preferred features and embodiments, it will be understood by those skilled in the art in view of the present disclosure that various changes and modifications may be made without departing from the scope of the invention. Accordingly, the claims appended hereto are intended to cover all such changes and modifications.

14. A method of making a resin transfer molding preform for a product having a surface concavity, said method comprising positioning oriented continuous fibers under tension onto a selected surface of a core, said selected surface having a concavity therein and a flexible web secured thereto forming a convexity over said concavity, said convexity being deformable into said concavity and being sufficiently firm to support said oriented continuous fibers, without substantial deformation, while being positioned under tension onto said selected surface.

15. The method of making a resin transfer molding preform according to claim 14, wherein at least one sheet of nonwoven continuous fibers is positioned under tension onto said selected surface.

16. The method of making a resin transfer molding preform according to claim 14, wherein at least one sheet selected from the group consisting of woven continuous fibers, knitted continuous fibers, and braided continuous fibers is positioned under tension onto said selected surface.

17. The method of making a resin transfer molding preform according to claim 14, wherein continuous fibers are woven onto said selected surface.

18. The method of making a resin transfer molding preform according to claim 14, wherein continuous fibers are applied to said selected surface by filament winding.

19. The method of making a resin transfer molding preform of claim 14, wherein said method further comprises applying to a surface of said core fibrous reinforcement material comprising chopped fibers.

20. A resin transfer molding process comprising:
(A) positioning a preform in a cavity of a resin transfer molding tool, said preform comprising a core and fiber reinforcement material, a selected surface portion of said core having a concavity therein and said core comprising a flexible web secured thereto forming a convexity over said concavity, said fiber reinforcement material comprising oriented continuous fibers positioned over said convexity, said convexity and said continuous oriented fiber reinforcement material being deformable into said concavity;
(B) closing said molding tool on said preform, said molding tool pressing said convexity and said oriented continuous fibers into said concavity; and
(C) introducing resin into said cavity of said molding tool.

21. The resin transfer molding process of claim 20, wherein said molding tool cavity has a surface convexity which registers with said concavity of said core.

22. The resin transfer molding process of claim 20, wherein said resin comprises thermosetting resin.

23. The resin transfer molding process of claim 20, wherein said process further comprises removing at least a portion of said core subsequent to introducing resin into said cavity of said molding tool.

* * * * *